United States Patent
Nicolaisen et al.

(10) Patent No.: US 11,514,053 B2
(45) Date of Patent: Nov. 29, 2022

(54) CACHING OF POTENTIAL SEARCH RESULTS

(71) Applicant: Microsoft Technology Licensing, LLC, Redmond, WA (US)

(72) Inventors: Filip Ferris Nicolaisen, Oslo (NO); Jakob Werner, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 184 days.

(21) Appl. No.: 16/385,258

(22) Filed: Apr. 16, 2019

(65) Prior Publication Data
US 2020/0334257 A1 Oct. 22, 2020

(51) Int. Cl.
*G06F 16/20* (2019.01)
*G06F 16/2455* (2019.01)
*G06F 16/248* (2019.01)

(52) U.S. Cl.
CPC ...... *G06F 16/24552* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 7,945,683 B1 * | 5/2011 | Ambrose | G06F 16/9574 709/228 |
| 8,112,529 B2 * | 2/2012 | van den Oord | G06F 16/951 709/227 |
| 8,195,610 B1 * | 6/2012 | Traband | G06F 16/278 707/638 |
| 10,061,852 B1 * | 8/2018 | Plenderleith | H04L 67/2842 |
| 2003/0142871 A1 * | 7/2003 | Ishikawa | H04N 21/4335 382/233 |
| 2005/0283468 A1 | 12/2005 | Kamvar | |
| 2006/0084429 A1 * | 4/2006 | Buvaneswari | H04W 24/00 455/424 |
| 2007/0192300 A1 * | 8/2007 | Reuther | G06F 16/2452 |
| 2007/0208755 A1 * | 9/2007 | Bhatkar | G06F 21/6218 |
| 2008/0115082 A1 * | 5/2008 | Simmons | G06N 5/02 715/804 |
| 2012/0023120 A1 | 1/2012 | Kanefsky et al. | |

(Continued)

OTHER PUBLICATIONS

"International Search Report and Written Opinion Issued in PCT Application No. PCT/US20/024358", dated Jun. 24, 2020, 11 Pages.

*Primary Examiner* — Jau Shya Meng

(57) ABSTRACT

A method comprising: receiving portions of a search query searching amongst multiple entries in a set of one or more data sources; triggered by the receipt of each respective portion, performing a respective caching operating comprising querying each of one or more data sources of the set to retrieve entries matching the search query as composed from the portion or portions received so far, and caching the retrieved entries in a corresponding cache group for each of the queried data sources; rendering an application view displaying a visual representation of at least some of the retrieved entries; and with each caching operation, selecting one or more of any newly retrieved entries in the cache following the retrieval based on the search query as now including the respective portion of the search query, and updating the application view to include the one or more selected entries from the cache.

20 Claims, 9 Drawing Sheets

(56) References Cited

U.S. PATENT DOCUMENTS

| | | | |
|---|---|---|---|
| 2013/0073586 A1* | 3/2013 | Aubry | G06F 16/2455 |
| | | | 707/769 |
| 2013/0132372 A1* | 5/2013 | Gilbert | G06F 16/25 |
| | | | 707/769 |
| 2013/0159347 A1 | 6/2013 | Klein | |
| 2016/0092568 A1* | 3/2016 | Barzik | G06F 16/285 |
| | | | 707/722 |
| 2017/0220677 A1* | 8/2017 | Kazi | G06F 16/3344 |
| 2018/0300392 A1* | 10/2018 | Lei | G06F 16/3334 |

* cited by examiner

CACHING OF POTENTIAL SEARCH RESULTS

TECHNICAL FIELD

The present disclosure relates to performing a search for potential results from one or more sources based on a search query entered by the user, and to the caching of potential results.

BACKGROUND

Many computer systems and services include a search facility enabling a user to enter a search query seeking a target data record for some target entity, such as contact or profile information for a particular other person or group of people, or product information for some desired product. The data source being searched may be external to the user terminal from which the user performs the search. As such, it is known to cache some of the potential results from the data source locally on the user terminal in advance of the search query. If the search query happens to match one of the cached records, this enables the result to be displayed to the user with a lower latency compared to querying the external data source only reactively after the search query is entered.

For instance, there are two commonly used approaches in people selection. The first may be referred to as small-cached, and the second may be referred to as large-cached. The small-cached approach is often used by mobile clients, whilst the large-cached approach is more commonly used by desktop clients or web-based systems.

The small-cache approach often used on mobile devices employs a directory fall-back mechanism. Upon start-up the client retrieves and caches a set of data either from the device contacts stored locally on the mobile user device, or from the user's top N contacts from the user's mailbox on his/her mailbox server, which means one of these two lists is now readily available for filtering and matching (cached in advance of any search query being entered). Both data sources have a non-commensurable ranking, so that interleaving is commonly not done. As the user types letters of the search query, this pre-cached result-set is filtered locally on the user device (according to either a verbatim match requirement or fuzzy matching) until either a set of one or more matching ones of cached results remains, or the result-set is empty. If the latter, the user is presented with an option to fall back to search a wider directory of contacts on a server, where this directory is a global list of all contacts within an organization to which the user belongs. Entries in this directory are searched directly within the directory and not cached. One therefore is always in one of two modes of search, either local (cached) or external directory (not cached). Also, each time the user adds a letter to the letter-series that he/she is searching, the user has to click search again which discharges any cached results and triggers a completely new search (e.g. if the user types "Joh", then hits 'Search Directory', and this doesn't return the right or sufficient number of people, and then the user types another characters, so the string is "John", then the user will need to trigger a new search to the search directory to get new results, thus requiring an extra keypress).

For searches performed by desktop clients, or searches by web-hosted clients accessed from a mobile or desktop device, another approach is typically used. Desktop searches commonly use the large-cache, and web-based searches use a hybrid approach. For both desktop and web, the top N contacts are cached on the user device, e.g. where N equals 1500. Typing a search query invokes filtering of this cache. Once the cache is discharged, a fall-back query to the online directory is done. For web searches, there is what is called a hybrid approach. As the user types, the query is submitted to both the pre-cached top-N list in the cache and the online directory (which is not cached). If the query to the online directory takes more than 1000 ms, the local results from the cache are shown to the user without any results from the directory until those become available. This ensures low latency, but sometimes causes results to switch place right before the user selects. In both experiences, the results-list is refreshed for each letter typed.

SUMMARY

According to one aspect disclosed herein, there is provided a method performed by a user terminal. The method comprises: receiving portions of a search query searching for a target entry amongst multiple entries in a set of one or more data sources, the portions being received one after another in a sequence; and triggered by the receipt of each respective one of said portions (e.g. each character), performing a respective caching operating comprising querying each of one or more data sources of the set to retrieve entries matching the search query as composed from the portion or portions received so far in the sequence, and caching the retrieved entries in a corresponding cache group for each of the queried data sources. The method further comprises: rendering an application view displaying a visual representation of at least some of the retrieved entries; and with each caching operation, selecting one or more of any newly retrieved entries in the cache following the retrieval based on the search query as now including the respective portion of the search query, and updating the application view to include the one or more selected entries from the cache.

As the cache is topped up with the entry of each individual portion of the search query (e.g. each letter or character), this may be referred to herein as a "dynamic backfill" of the cache. This enables a better chance of presenting relevant results faster compared to simply caching a fixed list of top N results in advance, but with lower latency than a directory fall-back.

In embodiments, the application view may display the selected entries in an order in which they were received at the user terminal. In some alternative embodiments, the application view may display the selected entries ordered by cache group. As another example, in embodiments the application view may display the selected entries ordered by cache group and then within each cache group in the order they were received at the user terminal.

In embodiments, the set of data sources may be a set of multiple data sources, and the queried data sources may be a plurality of the data sources of said set. In this case the entries retrieved from each of the queried data sources being cached in a different corresponding cache group. In some such embodiments, at least some of the plurality of queried data sources may be external to the user terminal, in which case the entries retrieved from each of the external data sources being retrieved via a network. Further, in embodiments the multiple data sources may each have a different latency to retrieve the entries from the data source to the user terminal.

Combined with the dynamic backfill, the provision of the different cache groups for the different sources means that the different cache groups are filled and their results displayed in parallel, independently from one another, rather than exhausting one source before moving on to the next, etc. I.e. the mechanism does not wait to query and show the results from one data source before doing so for any others of the data sources, nor in any way tie the timing of the querying and display of results from one data source to that of any of the other data sources. The alternative way to handle multiple sources would be to delay the display of results from one source until the query to another sources has been exhausted or timed-out (see the directory fall-back and hybrid approaches discussed in the Background section). However this leads to more delay before potentially relevant results from at least one of the data sources can be output to the user. By applying the dynamic backfill approach to each of a plurality of independent cache groups in parallel on the other hand, this leads to a better chance of relevant results being presented more promptly to the user (i.e. with lower latency).

In embodiments where the selected entries are also displayed in the order they are received, this further improves the latency with which results are output to the user. The trade-off is a loss of "stability"—referring to the expectation of some users that if the same search query is entered on different occasions, the search results for that same search query should be displayed in the same order each time. However it is recognized herein that the loss of stability can be a worthwhile trade-off for reduced latency.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Figure 1:
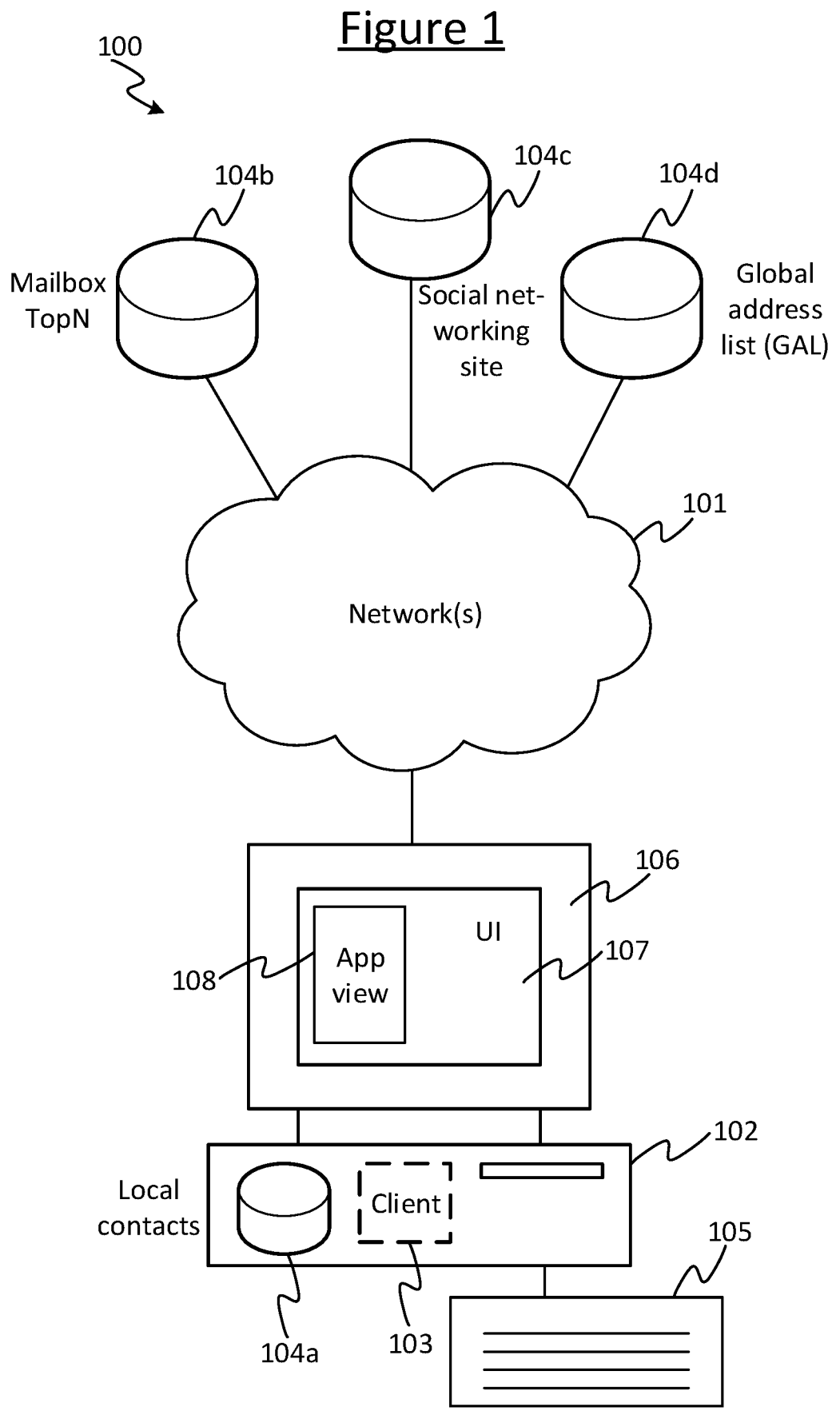
FIG. 1 is a schematic block diagram of a computer system.

There are various scenarios where a user may wish to search for a record of an entity from amongst different data sources. It would be desirable to be able to show results to the end-user quickly (performance), while also securing that the right entity is available for selection (completeness). Common solutions have different pros and cons, like caching (memory-intensive) and streaming (CPU and bandwidth intensive). The normal way of performing queries is evicting the whole cache on each query, to optimize results for the query-string. The following discloses an approach which is a compromise between these approaches, having a piece-wise stream of different segments and/or sources, with frequent updates to the different segments. It can provide a marked improvement in latencies for various application scenarios, whether searching for a person whom the user collaborates with often or person whom the user is making contact with for the first time.

The user-job may be stated as follows. The user wants to select an entity that he or she is looking for, as easily as possible, without knowing where the record of the entity originates. By way of example in the following, the entity will be assumed to be a persona that the user wishes to select, to interact with in some way, maybe to share some information, invite to some collaborative event or as a recipient of targeted information. A "persona" herein can be any party, either an individual person or groups of persons. Alternatively the entity could be any other thing, such as a product, document, etc. For the sake of discussion, the following will assume that the entity sought is a person.

The record of the entity (e.g. person) may be found in any of a set of one or more data sources. A source in this sense may for example be any repository or directory of persons, i.e. some collection of people information, accessible through some interface. The user-job may then be formulated as follows. The user wishes to select the person whom he/she is looking for as easily as possible, without knowing what the source of the person-information is.

In embodiments there may be multiple potential sources to search amongst. For instance there are a plethora of people-directories nowadays, inside and outside of a given organization or service, from the list of contacts stored on a phone sim-card, to the graph or a social networking network, which might be the biggest publicly accessible list of people. The particular directory or directories searched are not essential for the present purposes. Nonetheless, in embodiments the directories searched do differ somewhat in the latency of the interface. The sources can also be accessed independently of one another.

As an example, the available sources to be queried may comprise: i) device contacts, being contacts the user has stored on his her user device, such as the user's phone, tablet or PC, typically sorted alphabetically; ii) mailbox top-N contacts, being the people in the user's mailbox that he/she has emailed with in the past, sorted by how much the user has communicated with them; iii) a global address list (GAL), which is a directory of contacts in the same organization (e.g. company) as the user, again typically sorted alphabetically; and/or iv) a social media directory, e.g. first-order contacts of the user. One person may be present in several sources but must be available in at least one if the user is to find that person in the search. The disclosed scheme is particularly (but not exclusively) useful if there is a noticeable difference in the interface of the sources, either in that they have different access control, different latencies, different reliabilities, or different sizes.

There are many forms of ranking search results. Examples include alphabetical ranking, ranking by importance, and random. In the case of alphabetical ranking, the people in the list may be ranked for example by the letter of their first name, or in other implementations their last name. In the case of ranking by importance, this may mean that, e.g., a person with whom the user has communicated more often is higher ranked than others. In the case of random ranking, the people in the list are pseudo-randomly ranked. In embodiments of the presently disclosed mechanism, any such raking or ordering scheme or others may be used, for instance, to determine the top N contacts of the user.

Embodiments may assume a global ranking as a rank which is adhered to outside of the person, device, app or scenario in question. E.g. if the list of people in the social networking directory are sorted alphabetically, they are always sorted alphabetically invariant under what the user is doing. The local ranking on the other hand may refer to the order in which the people suggestions appear in the current user-job, when the user wants to select the person they are looking for. So if the user is looking for Joe, and Joe is the 3rd person suggested, he will have the local rank 3, independent of what global rank he or she has.

By "target" entity, this means the entity (e.g. person) that the user is actually looking for, such as John. The target record or entry is the record of the target entity in one (or more) of the data sources.

FIG. 1 shows an example computer system 100 for implementing a search caching scheme in accordance with embodiments disclosed herein. The system 100 comprises a user terminal 102 and a set of one or more data sources 104. The user terminal 103 may for example take the form of a desktop computer, laptop computer, tablet, smartphone, or wearable device such as a smart-watch or smart-glasses. It comprises a display screen 106, and a user input means 105. The display screen 106 may for example be a touch screen or a non-touch screen employing any suitable display technology such as LEDs, a LCD or a CRT. The user input means 105 may for example comprise any one or more of: a keyboard, keypad, mouse, trackpad, tracker ball, joystick, and/or the input sensors of a touch screen (which could be the same or a different screen as the display screen 106). The display screen 106 and input means 105 may be integrated into the same housing as the rest of the user terminal 102 or could take the form of peripherals connected to the main body of the user terminal 102 via a wired or wireless connection, or any combination of integrated and peripheral components.

Each data source 104 comprises a directory of data records for multiple different entities of the type the user searching for (e.g. people), where a directory as referred to herein could take the form of any list, database, graph or other searchable data structure.

The data source(s) 104 may comprise one or more data sources that is/are internal to the user device 102. For instance one such data source 104a is shown in FIG. 1 by way of illustration. For example this could comprise a directory stored in one or more internal storage units, e.g. a storage unit employing an electronic storage medium such as a solid state drive (SSD), flash memory, EEPROM; or a storage unit employing a magnetic storage medium such as hard disk drive, etc.; or any combination of two or more different storage media or units. The internal data source may for example comprise a list of device contacts stored locally on the user terminal 102.

Alternatively or additionally, the data source(s) 104 may comprise one or more external data sources 104. Three such sources 104a, 104c, 104d are shown in FIG. 1 for illustrative purposes, but it will be appreciated there could be other numbers involved. Each external source may be implemented on one or more storage units of a server accessible to the user terminal 102 via one or more networks 101, where a server herein can refer to one or more physical server units at one or more geographic locations. The storage units may again take any suitable form, such as a storage unit employing an electronic storage medium such as a solid state drive (SSD), etc.; or a storage unit employing a magnetic storage medium such as hard disk drive, etc.; or any combination of two or more different storage media or units. In the case of multiple external sources 104a, 104c, 104d, these could be implemented on the same server or different servers. Each external source may be accessed by the user terminal 102 via one or more networks 101. In the case of multiple external sources 104a, 104c, 104d, these may be accessed via the same network or different networks. E.g. the user terminal 102 may be arranged to access one or more of the external sources via a wide area internetwork such as the Internet, but one or more others of the external sources via a local area network such as a company intranet.

The user terminal 103 is installed with a client application 103. The client application 103 is stored on one or more storage units of the user terminal 102, which may for example comprise a storage unit employing an electronic medium such as an SSD, flash memory or EEPROM; or a storage unit employing a magnetic medium such as a magnetic hard disk drive; or any combination or two or more storage media or units. The storage on which the client 103 is installed could be the same or a different physical storage unit or units than any internal local directory 104a (such as the list of device contacts). The client 103 is arranged to run on a processing apparatus of the user terminal 102, the processing apparatus comprising one or more processing units such as a central processing unit (CPU), graphics processing unit (GPU), digital signal processor (DSP), application specific integrated circuit (ASIC) or field programmable gate array (FPGA), etc.; or any combination of two or more processing units. The client application 103 may for example take the form of a VoIP client, an instant messaging (IM) client, a collaborative workspace client, a client of a suite of office or business applications, a client of a social networking service, or a dedicated people searching application, etc. Alternatively the client application 103 could be general purpose client application such as a web-browser for accessing a specific service hosted externally on a server via one of the networks 101, e.g. a web-hosted VoIP and/or IM communication service, collaborative workspace, social network, or suite of office or business applications hosted on the web or elsewhere online.

When run on the processing apparatus of the user terminal 102, the client application displays a user interface 107 on the display screen 106 of the user terminal 102. The user interface 107 comprises an application view ("app view") 108, which includes a list of search results found by the application 103 based on a search query entered by the use through the user input means 105. The client application 103, when run on the processing apparatus of the user terminal 102, may be arranged to operate as follows (either by integral functionality of the client application 103 itself or by accessing a service hosted on a server, or a combination of these). It performs the following operations using the user input means 105 to receive the search queries from the user, and the application view 108 in the user interface 107 displayed on the display screen 106 to display corresponding search results to the user.

The user wishes to submit query through the user terminal 102, to search for a record of a target entity such as a target party amongst the records of multiple such parties stored amongst the one or more data sources 104. Each data source 104 comprises a plurality of entries, each comprising the record of a respective entity (e.g. party) which could potentially be the entity the user is seeking, depending on what search query the user enters. The user enters the search query through the user input means 105. The search query comprises a string of characters representing the target entity the user is seeking.

In embodiments, the application 103 caches a subset of likely candidate entries from at least one of the data sources 104 in advance of the user beginning to enter the search query, for example the top M most accessed entries (e.g. contacts) from a list of the top N most accessed entities in the local device contacts 104a or mailbox 104b (e.g. the contacts the user communicates with the most). Some other sources 104 such as the global address list (GAL) 104d may not be worth caching in advance, e.g. because they are too large and the probability of caching a target result without any information is too small or even negligible. Alternatively the application 103 may not begin caching from any sources 104 until the user enters the first portion of the search query.

Either way, once the user begins entering portions of the search query, the application 103 dynamically triggers a cache fill operation with each portion (e.g. each character) of the search query as-and-when the user enters it. This may be termed herein a "dynamic backfill" operation. With each such operation, each triggered by the input of a respective character of the search query by the user, the application 103 queries each of a set of one or more of the data sources 104 for any entries that match the search query as entered so far, i.e. as composed of the portion or portions of the search query entered up to the present point in the process. Based on this, the application 103 retrieves and caches at least some of the entries found in a cache layer on the user terminal 102. Preferably, this results in the application view 108 being updated with the retrieved entries for the current portion in the series before the user enters the next.

The cache layer may be a data holding area on-board the user terminal 102 that has a lower latency than any of the data sources 104 involved in the search, i.e.: i) the time between accessing the cache layer and displaying the cached results in the application view 108 is lower than ii) the time it would take to access the corresponding data source 104, retrieve the results and displaying them directly in the application view 108. Beyond this, the term "cache" as used herein does not limit to any particular layer of cache nor necessarily to an architectural (hardware) layer of cache in the hardware of the processor(s) of the processing apparatus on the user terminal 102. For instance the cache layer could be implemented in general purpose RAM, or an architectural cache between RAM and the registers of the processor(s) of the processing apparatus, or even a high speed non-volatile storage that has a lower latency than, say, the non-volatile storage on which the device contacts 104a are stored.

Note that depending on implementation, a "match" for the search query or portion of the search query could require a hard match (identical string) or a soft match (e.g. using fuzzy matching, such as to accommodate possible spelling mistakes or typos in the user's search query). Various other options for search matching, such as being case sensitive or non-case sensitive, requiring whole word, etc., are known in the art, and it will be appreciated that the scope of the disclosure does not need to be limited to any specific matching technique. The term "entry" here refers to a particular record in one of the data sources 104, or the cached version thereof held in the cache layer or application view 108. A given entry comprises a record of a given entity, e.g. party (for instance a contact of the user). The cached version of an entry may comprise some or all of the information of the same entry as stored in the data source 104. An entry that matches a search query, that matches a selection criterion, or that is cached, may also be referred to herein as a "result" or "hit".

In the case of multiple sources 104, then with each cache operation, the application caches any of the results retrieved from each queried source 104 in a respective cache group 204 (e.g. see FIG. 2-16, to be discussed in more detail later). For instance, the cache groups 204 may comprise a device contacts cache group 204a for caching the results from the device contacts 104a, a top-N cache for caching results from the top-N list in the mailbox 104b, a social networking cache 204c for caching results from the social networking site 104c, and/or a global address list (GAL) cache 204d for caching results from the GAL 104d.

Each cache group 204 is a data structure holding the respective cached results from the respective source. They may be implemented in the same physical data holding area as one another (e.g. same RAM or architectural cache) or different physical areas, or a combination. The cache groups are structurally different in implementation, to enable the sequencing described in relation to embodiments herein.

Note that social networking as referred to herein does not exclude business networking. The social networking site could be a leisure social networking site or a business social networking site. The term "social" here is used to refer to the forming of connections between people and/or groups of people, not to distinguish leisure vs. business.

In the case of multiple sources 104, the different sources 104a-104 may have different latencies. Here the latency refers to the time between initiating access of the source 103 to query with a search query and receiving back the corresponding result(s) back at the user terminal 102.

With each portion of the search query input by the user, and each respective cache fill operation, the application 103 takes a selected subset of any newly cached results from each cache group 204 and displays this subset to the user in the application view 108. For instance, in embodiments the results in each subgroup are ranked according to some criterion or metric, e.g. how often the user has interacted with the corresponding entities in the past (e.g. how often the user has communicated with the contacts in the past). This may be the same ranking that the corresponding entries have in the data source from which they were retrieved. The subset taken from the cache group 204 to the application view 108 may be the top ranked results up to a predetermined maximum number. The predetermined number may be different for different ones of the cache groups 204.

In embodiments, the application 103 is arranged to display the results in the application view 108 in the order they were received at the user terminal 102 from their respective data sources 104. Hence in the case of multiple data sources 14, the results from the data source(s) with the lower latency will automatically tend to be displayed higher up the list in the application view 108.

An example use case is now described with reference to FIGS. 2 to 16. These figures show how results from four example sources 104a-d are stored in separate respective cache groups 204a-d. It will be appreciated that similar principles may be also applied to different numbers of sources 104 of other types, and to searches for entities other than people.

Consider for example the four sources above: device contacts 104a, the mailbox top-N list 104b, the list or graph of social networking contacts 104c, and the global address list (GAL) 104d. The top-N list 104 is a list of the N contacts the user communicates with the most according to some metric, ranked according to that metric (example metrics for doing this are in themselves known in the art). The social networking service 104c may for example be a business networking service whose brand name begins with the letter L. As such, results (cached entries) 201 retrieved from the four sources 104a-d are denoted by the letters D, T, L and G respectively in FIGS. 2-16.

As mentioned, the four sources 104a-d have different characteristics. Examples of some properties that may differ are shown in the table below, where latency in this case is the time from query to result on the 90th percentile, and averaged relevancy is the chance of finding the person the user is looking for in that particular source (note again, one person might be present in multiple sources).

| Source | Latency | Average Relevancy | Population | Ranking |
|---|---|---|---|---|
| Device contacts (D) 104a | 25 ms | 0.80 | 420 | By device-contact frequency |
| Mailbox top-N (T) 104b | 350 ms | 0.90 | 1,500 | By email frequency |
| GAL (G) 104d | 1000 ms | 0.99 | 10,000 | Alphabetical |
| Contacts of the user in the business networking service (L) | 1500 ms | 0.85 | 800 | By rank of connectivity with the user within the business networking graph |

Each cache-group 204 is responsible for fetching its own data. The designer of any given instantiation of the disclosed scheme can set how many results to retrieve from the respective data source 104 into each group 204, as well as how many of these results to display in the application view 108, and what order to display them in. The designer may also choose a user experience rank of each group. Alternatively, results are shown in the application view 108 in the order they are received, which if the sources 104 have different latencies, will tend to order by keystroke and then group (source). In embodiments any one or more of these parameters may be selected by the designer independently of one another. That means the designer can optimize between the different sources for each experience. In embodiments one or more of the above parameters may even be selected by the user, again independently for each group 204.

Figure 2:
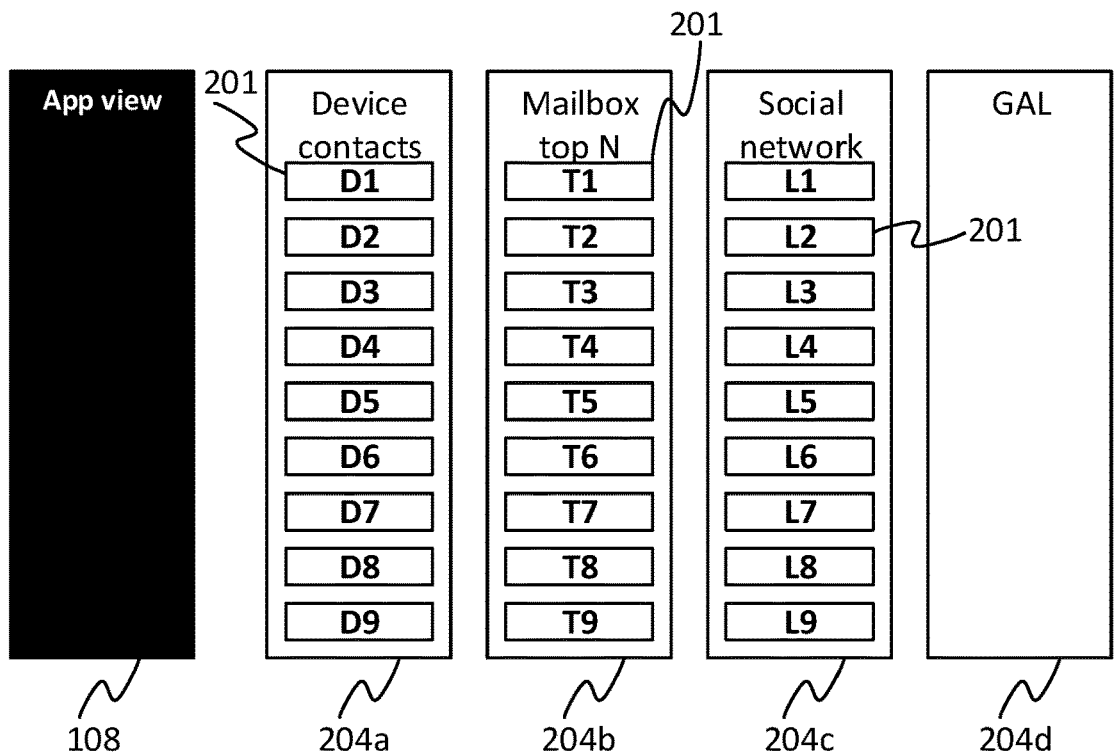
FIGS. 2 to 16 each schematically illustrate an app view and a plurality of caches.

FIG. 2 shows a first, optional step in the process. Here, before the user inputs any portions of the search query, the application 103 retrieves an initial set of results from each of one or more of the data sources 104 and includes them in the respective cache groups 204. For instance, in the example shown, a respective initial set of entries is cached into the respective cache group 204a, 204b, 204c of each of the device contacts 104a, the mailbox top-N 104b, and the social networking contacts 104c. In each of these sources 104, the entries in the respective directory may be ranked. E.g. within each of the device contacts 104a and mailbox contacts 104b, the contacts may be ranked by frequency with which the user communicates with them; whilst the social networking contacts 104c may be ranked by connectivity within the social network.

The number of entries cached in the initial set for each cache group 204 may be a predetermined number, which may be set independently for each cache group 104 (e.g. by the designer or user). The initial set of cached results may for example be the top M ranked results from each source, where in general M may be set independently for each group 204 by the designer or user. Alternatively if the entries in the entries in a given source are not ranked according to estimated relevance, importance, likelihood or such like, then the set of entries to cache may be selected on a different basis, such as a random selection from amongst the larger number of entries in the source 104. In the illustrated example, since it is a priori almost equally likely to find the contact the user is looking for in each of the three sources 104a-c, the predetermined number M is set to the same for each group 204a-c. In the illustrated example, the number is 9, such that the application 103 fetches and caches 9 contacts from each of the three sources 104a-c, and stores them in the separate respective cache groups 204a-c. Note that in practice the number may be much larger, e.g. ~100 s or 1000 or more contacts. However for illustrative purposes a maximum cache group size of 9 entries is used by way of example. In embodiments, the application 103 does not fetch any entries from the GAL 104d yet, as there is little point in fetching random data from a large directory. The fetched contacts are stored in their respective cache-groups 104a-c in the order they are returned, in this case device contacts 104a, then mailbox top-N 104b, then social networking contacts 104c (device contacts 104a having the lowest latency of the three and the social networking service 104c having the greatest latency of the three). Alternatively the results could be ordered in the relevant cache group 204 in the order of their ranking.

Figure 3:
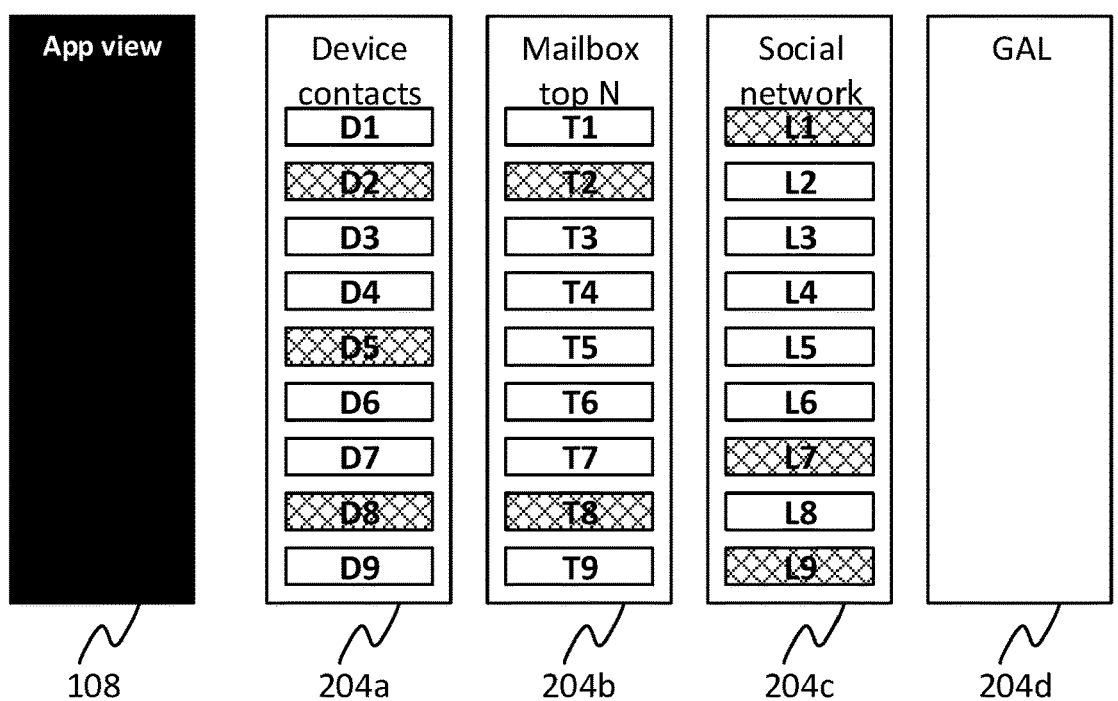
Figure 4:
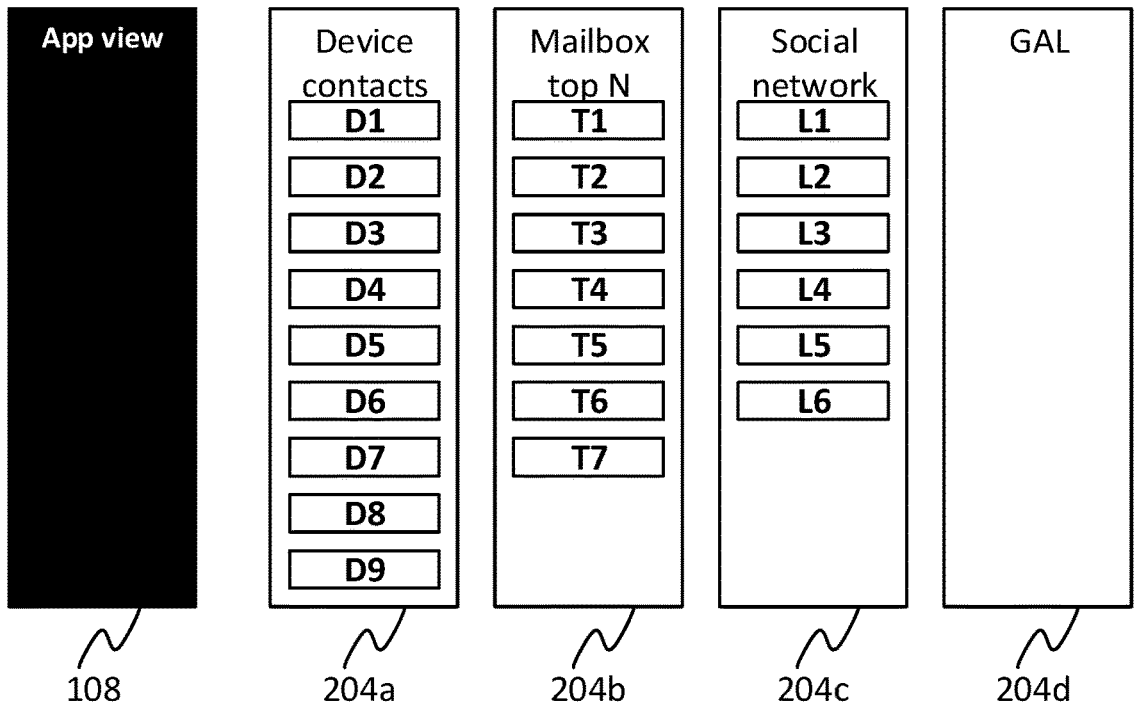

FIGS. 3 to 4 illustrate an optional step of removing duplicates. There may be some duplicates of contacts in different sources 104, and these may end up being cached such that duplicate contacts from different sources both end up in the cache in different respective cache groups 204. In embodiments a process is applied to remove these duplicates from the cache (i.e. remove all but one instance of each duplicate entry). As shown in FIG. 3, first the application 103 detects the duplicates and marks them in the cache. For illustrative purposes these are shown cross-hatched in FIG. 3. The application 103 will then remove each duplicate from all but one of the cache groups, so as to leave only one instance of any given result in only one the cache-groups 204, as shown in FIG. 4. In the example shown the application 103 removes the duplicates from the mailbox cache group 204b and the social network cache group 204c, leaving the instances in the device contacts cache group 204a, but it will be appreciated that this is just one example.

Figure 5:
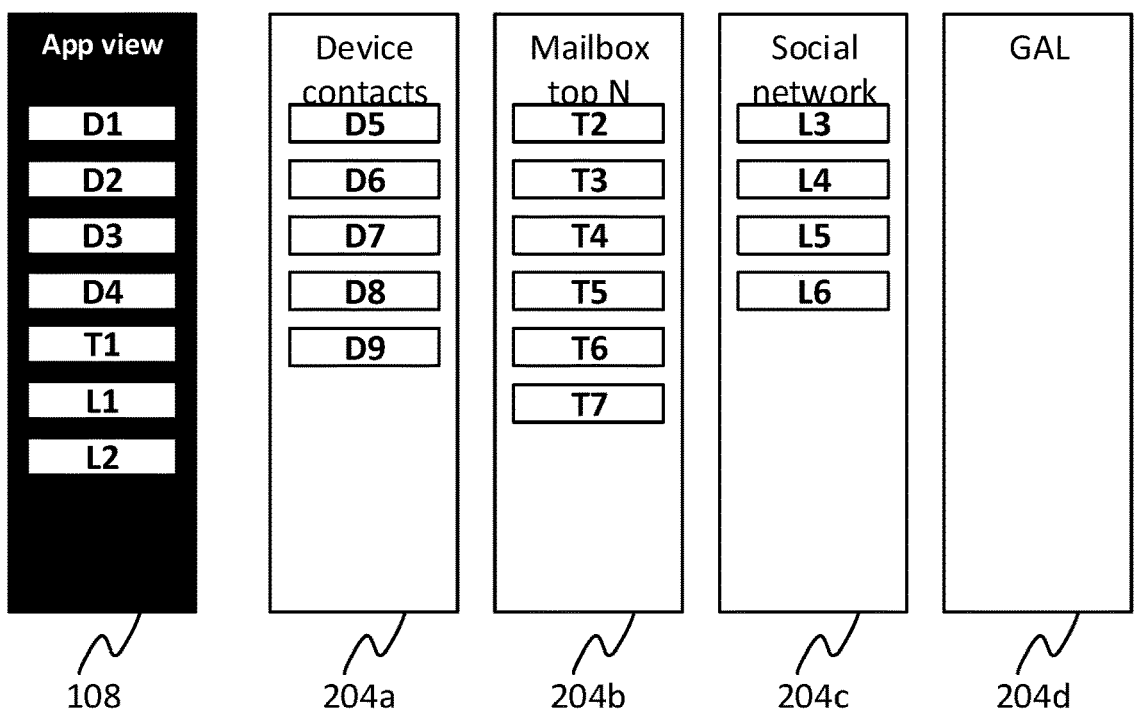

FIG. 5 shows a selection of the initial cache results being rendered in the application view 108 (following any duplicate removal). In embodiments, the results are rendered in the order they came in (the order they arrived at the user terminal 102 from their respective source 104). Hence results from the lowest latency source 104a (device contacts) will naturally appear first in the order in the app view 108, then the mailbox contacts 104b, then the social networking contacts 104c. Or in a variant of this, the cache groups 204 may be assigned predetermined order, e.g. ordered according to probability of finding a match in the corresponding source 104 as estimated by the designer. In this case the results are first ordered in the application view 108 by cache group, then individual results from within a group are ordered according to their order of arrival. In a similar variant, the cache groups 204 could be ordered manually by the user, or adaptively by the application (e.g. based on a relevancy metric determined adaptively based on the results the user selects to interact with over time).

The set selected from each cache group 204 for inclusion in the application view 108 may be all or a subset of the cached entries in the respective cache group 204. This may be determined either by how much space is available, or memory, or both. It could be predetermined at the design stage, or be adaptive, or set by the user. In embodiments the number to select from each cache group 204 is determined according to a predetermined scheme, in a predetermined ratio between the groups 204.

For instance, not knowing the distribution of the relevancy model, assume it is linear so that the odds of the target party being in a subset is equal to average relevancy*sample size/population. Call the probability of finding a person in a subset P(x), e.g. the probability of finding the target in a subset d of device contacts=PD(d). This then gives PD(d)=ARD*d/popD, where ARD is the average relevancy of device contacts, d is the size of the subset and popD is the total population of device contacts. Choosing a sample size of 4 for each then gives:

PD(4)=0.8*4/420=0.0076, or 0.76%.
PT(4)=0.24%
PL(4)=0.425%.

This is a simplification, since in practice there will tend to be an exponential distribution of relevancy for contacts, but the details of the distribution are not critical for the algorithm. The designer can tune the cache and viewed subset for each group, depending on the distribution model. Looking at the number above for example, one may decide to set the algorithm to take 4 results from the device contacts cache group 204a to display in the application view 108, but only 1 from the mailbox cache group 204b, and 2 from the social network cache group 204c.

As shown in FIG. 5, the selected results are removed from the cache groups 204, and put into the application view 108 (which is a cache-group in and of itself).

The results within in a given cache group 204 may be ordered, e.g. in the order they arrived at the user terminal 102, or according to an importance or relevancy metric. The subset selected to be transferred from a given cache group 204 to the application view may be the topmost subset according to this order (e.g. the earliest arrived in the cache group). So in the example shown, the top 4 results from the device contacts cache group 204a are transferred to the application view 108, the top 1 from the mailbox cache group 204b, and the top 2 from the social network cache group 204c.

FIGS. 6 to 16 now show the process of cache-matching, following any initial, pre-emptive caching as discussed in relation to FIGS. 2 to 5.

Figure 6:
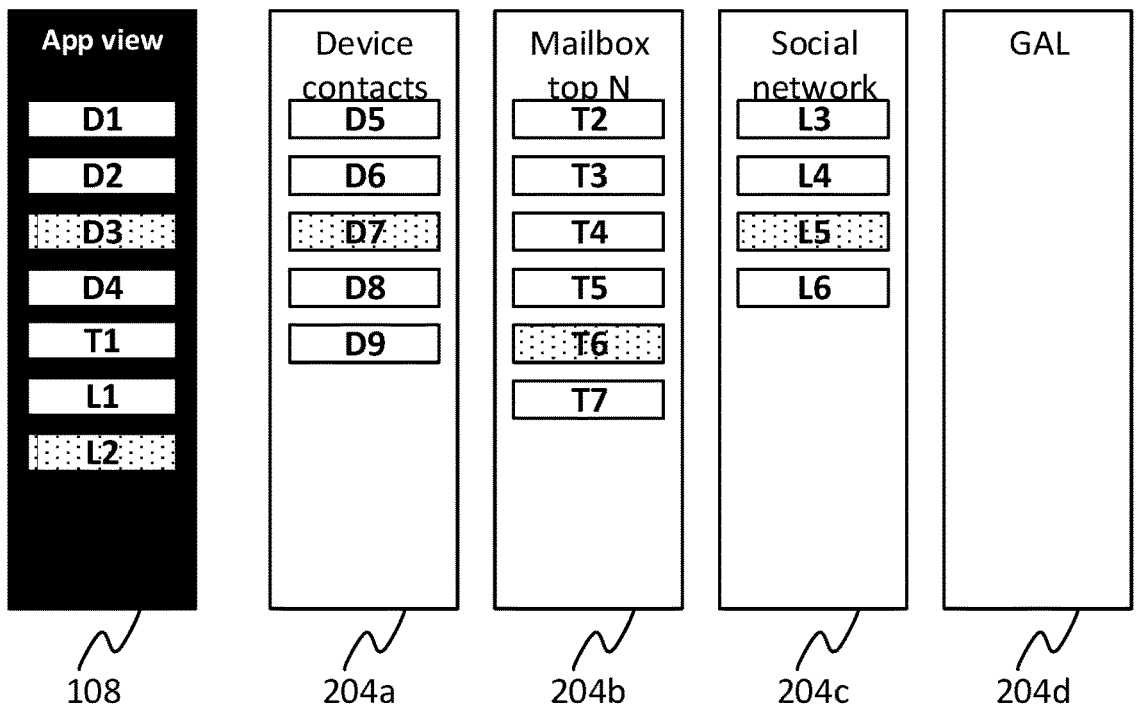

As the user now starts typing, the application 103 will filter down the results to the ones that match the query-text. If the user is looking for John, he/she will start by typing 'J'. In this case, the user might get hits on one or more of the results cached in one or more of the cache groups 204. An example is shown in FIG. 6, where some example hits (matches) for the first character "J" are shown shaded.

Figure 7:
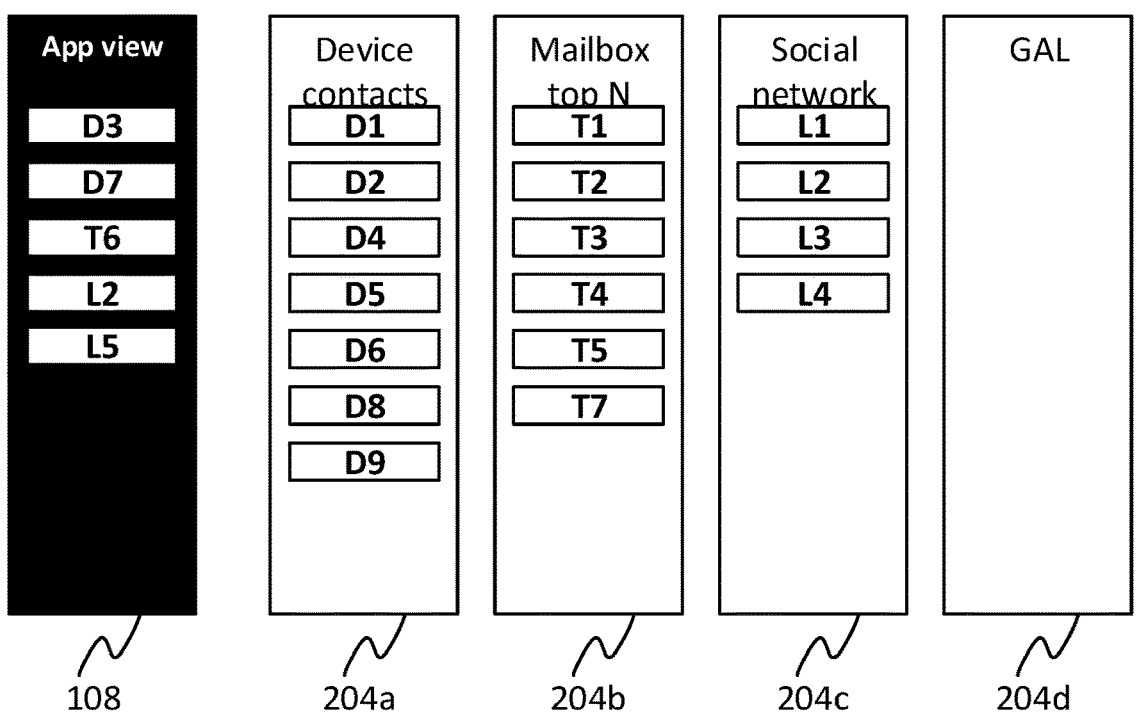

The application 103 can then instantly filter out the non-matching results from the application view 108. It also looks for hits (matches) in the cache groups 204 that were not selected for display in the application 108 in the initial step of FIG. 5. If any such hits are found, one or more of these are now transferred to the application view. The same selection criteria and ordering scheme as discussed in relation to FIG. 5 may be used. In the illustrated example, this leaves the application view 108 as shown in FIG. 7. Note that the results are still in the original order of sources, meaning that no results will switch places.

In embodiments, the application 103 shuffles the non-matches back into their respective cache groups 204. The reason for this is that users often type the wrong letter. Putting the non matches back in the cache enables them to be recalled again quickly if the user deletes his/her first letter and re-types a new one. However this is not strictly necessary. The application 103 may instead flush the cache groups 204 of any non-matches.

In embodiments, cache-grouping enables the designer, user and/or application 103 to manage the ranking of different sources 104 and their result-sets, as well as retaining high-level ranking of sources.

FIG. 7 shows and example of the filtered results after the user has typed 'J'. The next step is to perform a dynamic backfill operation to replenish the cache groups 204, as shown by way of example in FIG. 8.

The cache-grouping strategy enables the application 103 to dynamically backfill the cache groups 204 of each source 104. If in the state depicted in FIG. 8, then after typing the first letter 'J', each cache group 204 can now independently call its respective source 104 to top up the cache. This comprises submitting the partial search query 'J' to each of the sources 104 as a search request, to search for and retrieve entries that match the search query so far. These entries are returned from each source 104 to the user terminal 102 and cached in the respective cache group 204. They are shown diagonally hatched in FIG. 8. If there are more matches found in a given source 104 than the maximum size of the respective cache group 204, then only the top M matches may be retrieved an cached, e.g. according to a similar scheme as discussed in relation to FIG. 2.

Thus when topping up the cache, each group 204 is backfilled only with entries matching the query so far (in this example 'J'). In embodiments, results from the fourth source, the GAL 104d, are now retrieved into the fourth cache group 204d. This is because will now probably produce a more relevant result-set now that its results are filtered down based on the partial search query so far. In other implementations, the application 103 could be arranged to wait for more portions or characters of the search query before beginning to populate this cache group 204d (or indeed the cache group 204 of any source 104 whose entries are not ranked according to importance, relevancy or priority, or such like).

Figure 8:
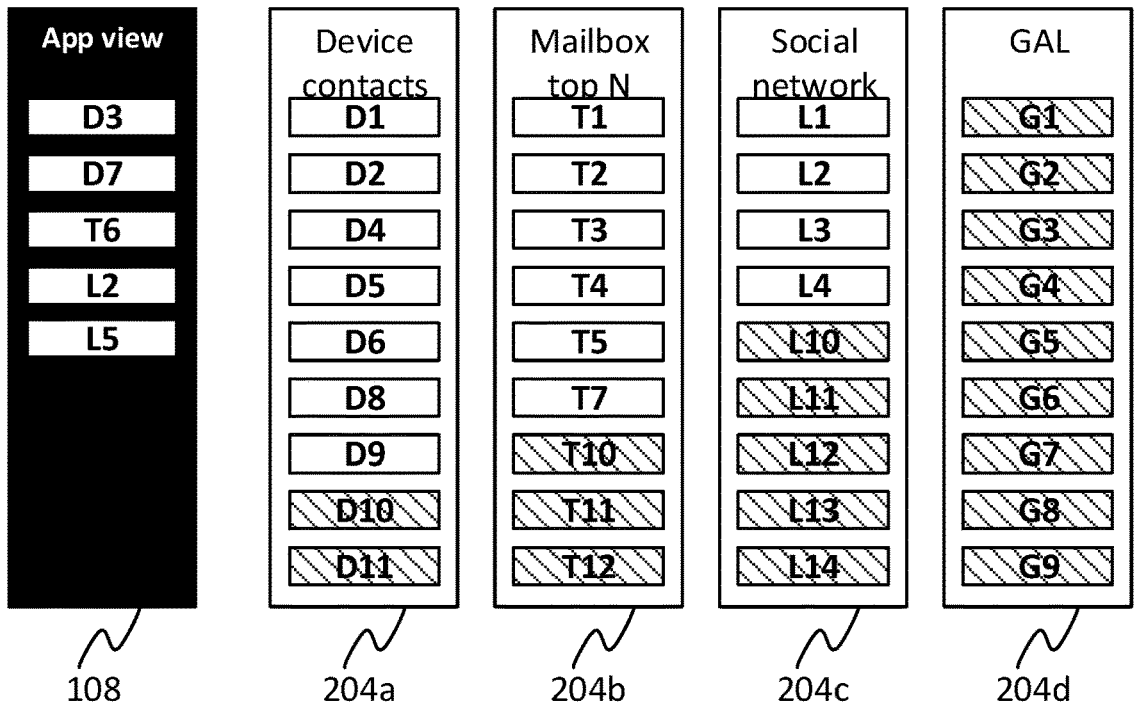

Note that at the stage shown in FIG. 8, all the newly cached entries (diagonally hatched) are matches for the partial search query entered so far, as are all the entries currently included in the application view 108. If the previous non-matches were returned to the cache groups 204 rather than being flushed, then most of the source-caches at this point will not match the query 'J', but as explained, these may be optionally be retained to avoid having to re-hydrate the cache in case the user changes his/her query. Thus in the example shown, only entries in the application view 108, as well as the entries in the cache groups numbered X10 or higher, match the query 'J'. Note also that all results from the GAL 104a match the query, since it has not been "polluted" with a zero-query.

For the sake of illustration it is assumed in the example that there are no duplicates in the new results. Optionally the process at this stage may involve another duplicate removal step similar to that described in relation to FIGS. 3-4. This duplicate removal may optionally be done at any or each dynamic backfill step, and will be taken as read in the discussion from here onwards.

Figure 9:
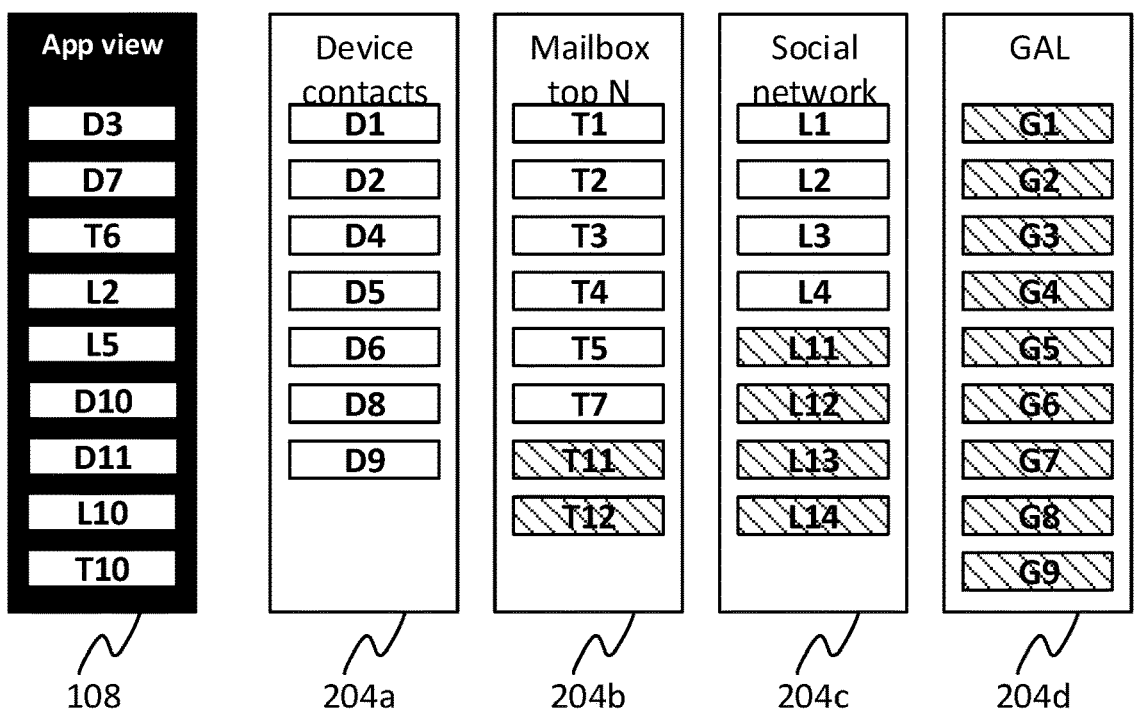
Figure 10:
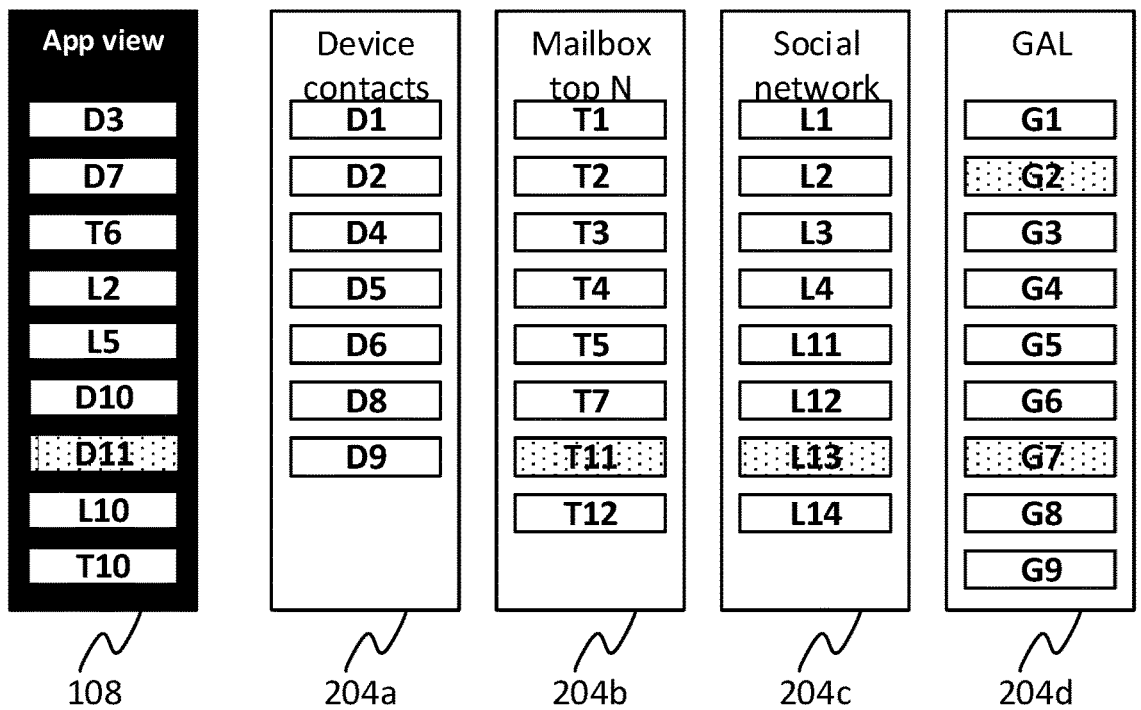

FIG. 9 shows the next step where a subset of the results that match the query 'J' are moved from the cache groups 204 into the application view 108. This may be done according to the same scheme as described in relation to FIG. 5, i.e. up to a predetermined maximum number of results are transferred to the application view 108 from each cache group 204, where this predetermined number may be set independently for each group 204 by the designer, user or application 103.

It may be assumed that the results return in the order of the average latency of the respective source 104, but this is not necessary for the strategy to work. Say for example that the device contacts 204a came in first (since they are on-device), then the social media contacts 204c, then the mailbox contacts 204b, and finally the GAL results 204d. In embodiments these are added to the application view 108 in a first-come-first-served fashion. Alternatively they may be sorted first by group then by order of arrival. E.g. in embodiments the application 103 may be arranged to display all or a subset of the results based on the odds that the target will be contained in the result, e.g. based on the predetermined average relevancies of the different sources 104.

The population sizes have now been reduced by roughly a factor 26 (the number of letters in the English alphabet), since the user has selected a character of the name, and assuming the names are equally distributed per letter (as a very rough approximation). The chances of finding the target have then increased to around 5%, 1.5%, 0.3% and 3% for device contacts 104a, mailbox contacts 104b, GAL 104d and social network 104c, respectively.

In the example shown, there are four free places left in the application view cache 108. Based on this, the application 103 will append the two new device contact suggestions, one social network suggestion and one mailbox suggestion. In embodiments the application 103 may be arranged to disregard the GAL from the app view 108 at the moment, as the odds of finding the right person there are still too low.

As these results are added, it would be possible to immediately do another backfill of the cache groups 204, again matching the query 'J'. However, embodiments do not do this: this is probably not worth the effort, as the app view 108 cache is full, and the source cache groups 204 would be pretty close given this distribution of probabilities and cache sizes. In other embodiments however, especially if there was a large source-cache to app view ratio, or a very high average relevancy, another backfill at this stage may be done.

The process has now gotten as far as it can based on the user typing one character. Since the user is looking for 'John', then he/she will now type the second character 'o'. In response, the application 103 immediately identifies any cache hits for 'Jo'. These are shown shaded in FIG. 10, i.e. D11, T11, L13, G2 and G7 (by way of example).

Figure 11:
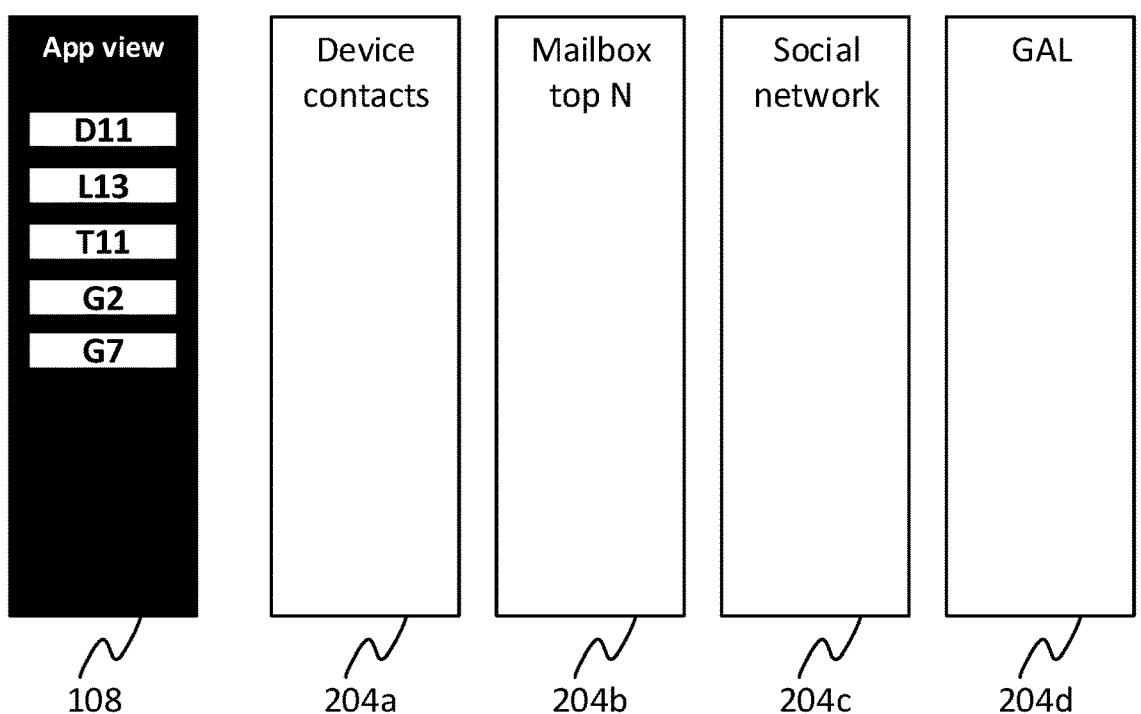

As shown in FIG. 11, the application 103 then filters out all the non-hits from the app view 108, and appends the matches from the source cache groups 204 there instead. The misses from the app-view 108 can either be recycled back to the cache groups, or thrown out, depending on the implementation and the available cache size. In the illustrated example they are evicted, because the application is about to immediately do a backfill of the cache groups 204. Thus the cache hits that matched only the letter 'J' are removed, and only the results matching 'Jo' remain. In alternative implementations, the results that were hits for 'J' but misses for 'Jo' could be recycled back to their respective cache groups 204 in case the user hits backspace and meant to type a different second letter, similar to FIG. 7 for the first letter. However, by this point it is more likely that the user has committed to his/her search term (the most likely letter for the user to re-type is the first letter). So in embodiments, as shown in FIG. 11, this is not done.

Embodiments may neglect the ordering of cache groups 204 on the first typed character, but may now take it into account in the second group. E.g. based on the probabilities above, and the fact that the set will now have been reduced by another factor of roughly 26, the designer may set the order to the device contacts group 204a first, then the social network group 204c, then the mailbox group 204b, and finally the GAL group 204d. Evicting all the misses, the caches now appear as shown in FIG. 11. This shows how the current cache hits on 'Jo' are all now in the app view 108, and the rest of the cache groups 204 have been evicted.

As the second character is typed, the application 103 also immediately sends search queries on 'Jo' to the sources 104a-d, to backfill the respective cache groups 204a-d. These are now refilled (in embodiments removing any duplicates as described previously).

Figure 12:
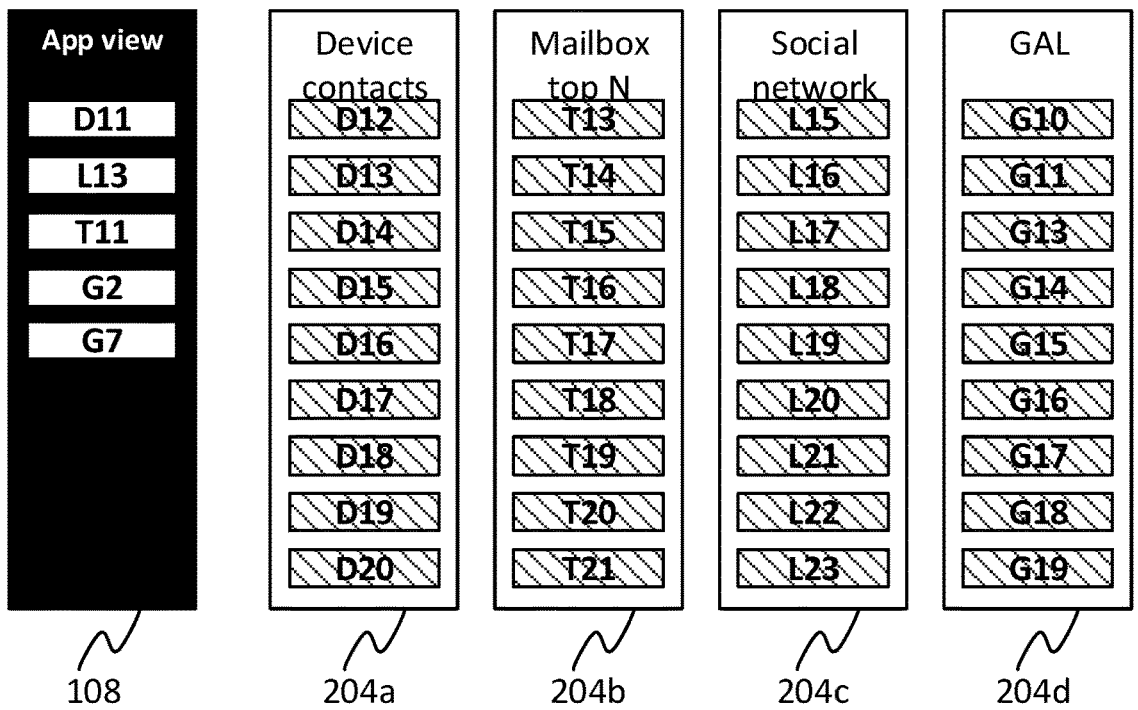

FIG. 12 shows the new dynamic backfilling of the cache groups (newly retrieved entries again shown with diagonal hatching). Now all results match the query 'Jo'.

Figure 13:
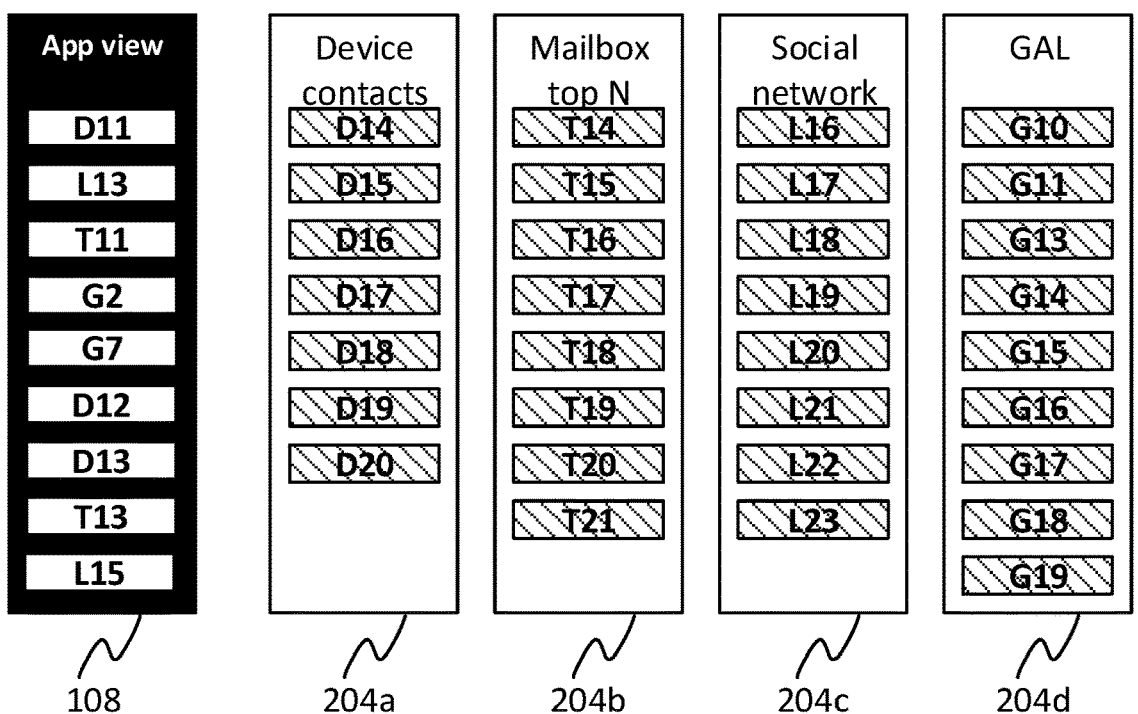

As shown in FIG. 13, the application 103 will then again append a selection of these new results to the app view 101, e.g. according to the same formula from before: 2 device contacts, 1 mailbox result and 1 social network result (assuming they came in first in the example shown). In the illustrated example, the application 103 at this stage does not allow more new results from the GAL group 204d into the app view 108, because there are sufficient results from the other groups 204a-c to fill the app view cache 108 to its maximum capacity and the GAL 104d is still the least likely source of results. In FIG. 13, the previous app view results 108 (before backfilling) still remain, and all results in the set still match the query 'Jo'.

Figure 14:
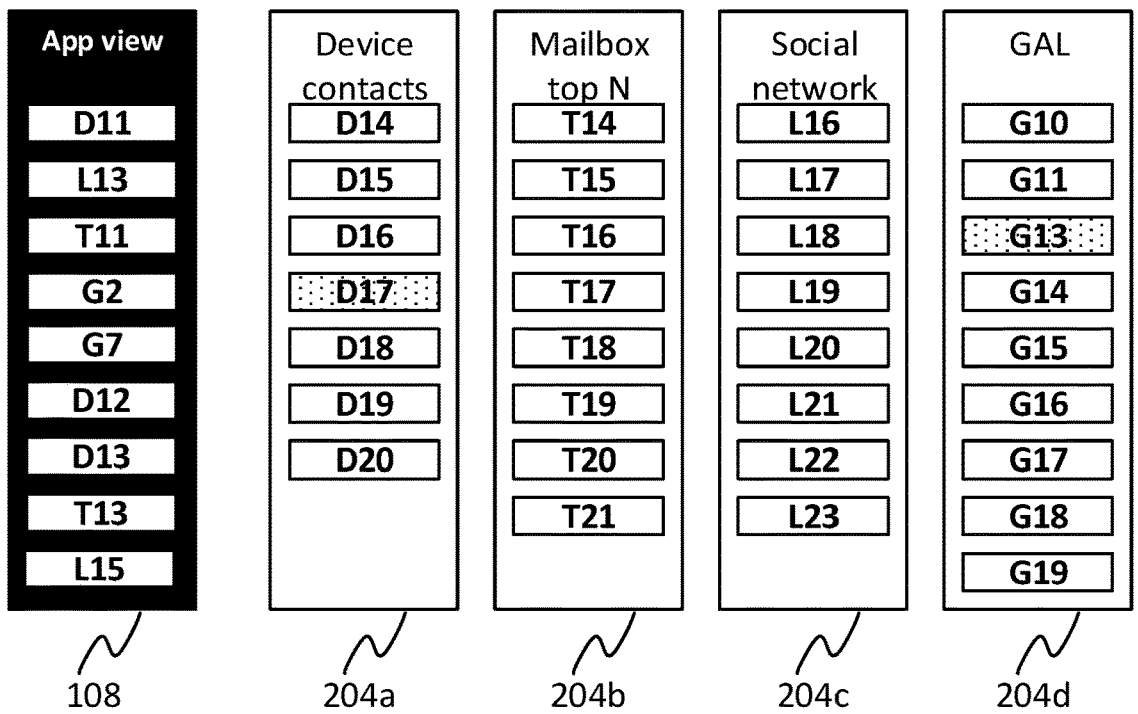

Consider now the third character. Assuming the target still has not been found, the user now types the third character 'h'. The application 103 immediately matches the caches on 'Joh', as shown in FIG. 14 (hits again shown shaded). In the illustrated example, only D17 and G13 are cache-hits.

Figure 15:
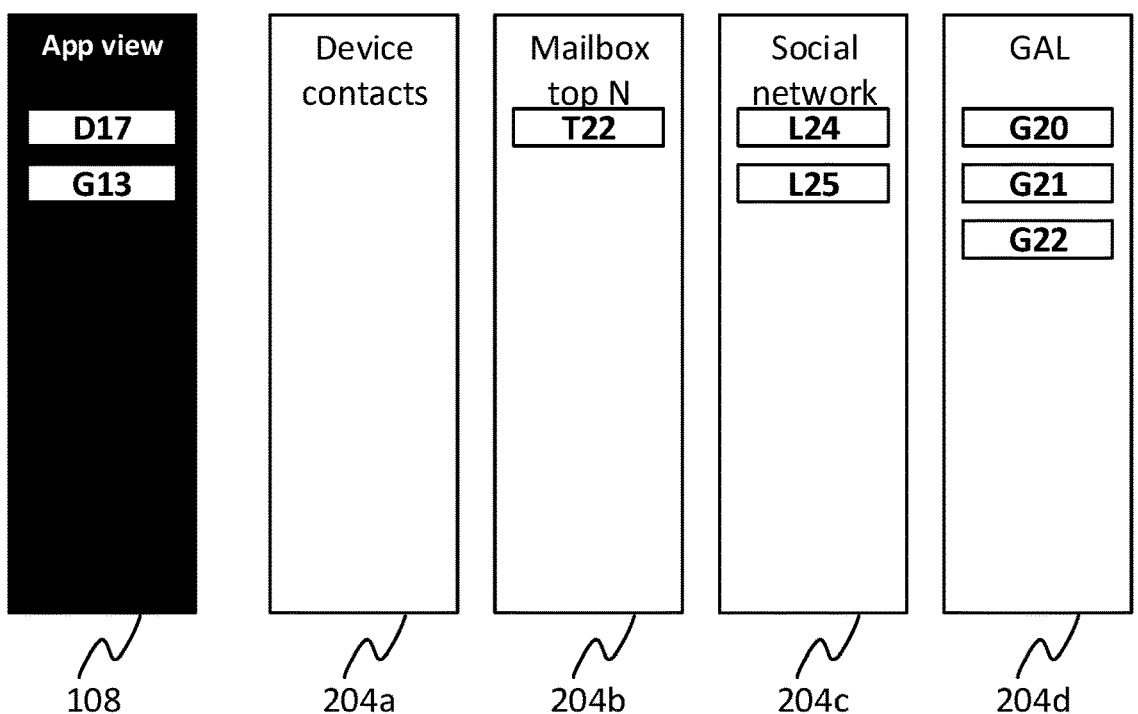

As shown in FIG. 15, the application 103 now flush the caches 204, keeping only D17 and G13 in the app-view 108. It also immediately refills the cache groups 204 from the sources 104 based on the query 'Joh'.

At this point, the odds of finding any match at all in the sources 104 is dramatically decreasing, since the search query is now three letters in, and the odds of hitting a name if letters in names were stochastically distributed are 1/20.000. This is only a very rough approximation, but say that there are now only a subset of 0, 1, 2 and 3 entries matching 'Joh' in the device contacts 204a, mailbox top-N 204b, social media contacts 204c and GAL 204e, respectively, in addition to the results already in the app view 108 (which in embodiments are de-duplicated). This ends up with the caches as shown in FIG. 15.

Figure 16:
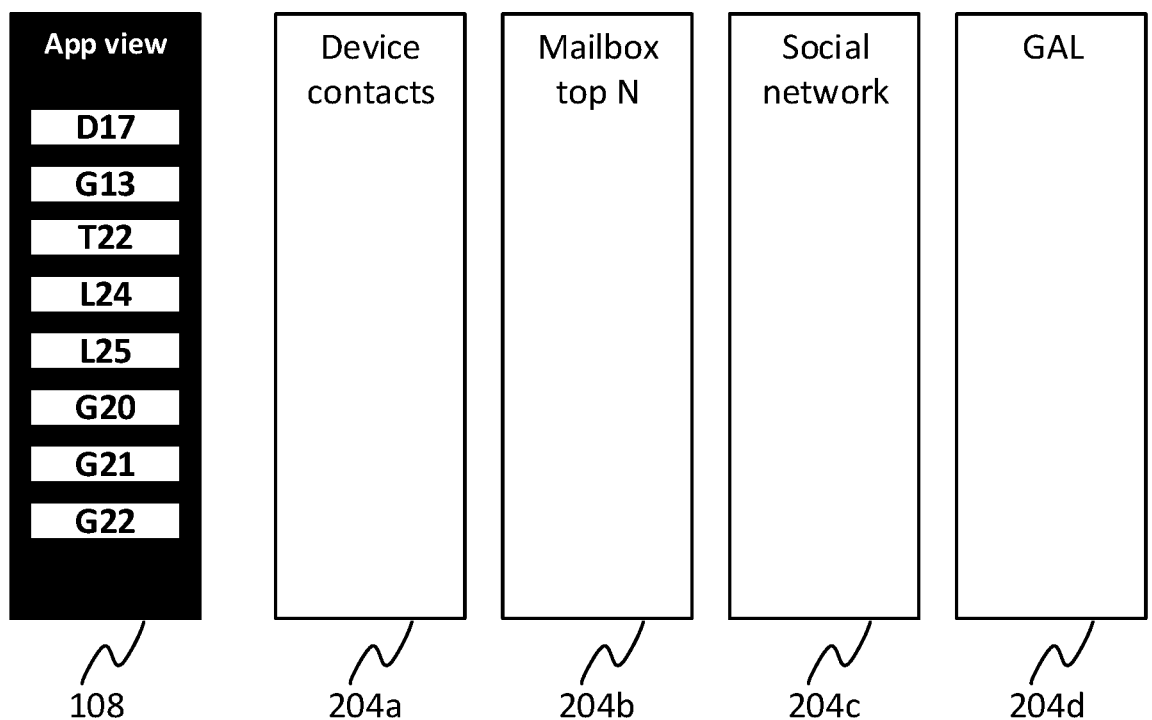

The application 103 then adds the new backfilled results to app view 108 again, assuming the same sequence of result sets in the example shown. FIG. 16 shows how all cached results are transferred to app view 108. The target should now be in the app view 108, as there are no more suggestions in the cache groups 204.

It will be appreciated that the above embodiments have been described by way of example only.

For instance, the disclosed techniques are not only applicable in the case of multiple data sources 104. The dynamic back-fill idea can also be applied to a single data source in order to improve the chances of retrieving and displaying multiple more relevant results more quickly. Further, the disclosed techniques are not limited to the application of people searching. In other applications, the searched entries could be other types of data record, such as product information, administrative records, etc. Further, the scope of the disclosure is not limited to the particular sources disclosed. E.g. the sources do not necessarily have to include an internal data source internal to the user terminal, or do not necessarily have to include an external data source external to the user terminal. The disclosed techniques may be used in relation to any combination of one or more internal and/or external data sources 104 in any form the form of lists, databases or graphs, etc.

Further, the results are not limited to being displayed in the order they are received. E.g. they could be ordered according to a rule such as alphabetical order, or results from a preferred one of the sources first, etc. In some embodiments the order of receipt is the only thing the results are ordered based on. However, in other, alternative embodiments, an advantage of having the different cache groups for the different sources is that one can artificially order the results by group/source, placing those from the most likely group first. Both approaches are possibilities. A fixed order of results is also possible, which favours stability ahead of latency. There are pros and cons with the different options: the "first-come-first-served" approach favours low latency, but sacrifices stability. The fixed ordering does the opposite.

In further variants of the disclosed techniques, the initial cache fill before the search query is entered is not essential. Search results could instead be retrieved and cached purely dynamically in response to the entry of the search query (though this would add some extra latency before the first results were output). Furthermore, while embodiments above have been described in terms of a dynamic backfill of the cache per character of the search query entered, more generally the dynamic backfill could be triggered per portion of the search query entered by the user, where each portion could be one or more characters. E.g. the dynamic backfill could be triggered every two characters, or such like.

More generally, according to one aspect disclosed herein, there is provided a method performed by a user terminal, the method comprising: receiving portions of a search query searching for a target entry amongst multiple entries in a set of one or more data sources, the portions being received one after another in a sequence; triggered by the receipt of each respective one of said portions, performing a respective caching operating comprising querying each of one or more data sources of the set to retrieve entries matching the search query as composed from the portion or portions received so far in the sequence, and caching the retrieved entries in a corresponding cache group for each of the queried data sources; rendering an application view displaying a visual representation of at least some of the retrieved entries; and with each caching operation, selecting one or more of any newly retrieved entries in the cache following the retrieval based on the search query as now including the respective portion of the search query, and updating the application view to include the one or more selected entries from the cache.

In embodiments, the application view may display the selected entries in an order in which they were received at the user terminal, or the application view may display the selected entries ordered by cache group, or the application view may display the selected entries ordered by cache group and then within each cache group in the order they were received at the user terminal.

In embodiments, at least one of the queried data sources may be external to the user terminal, in which case the entries retrieved from the external data source may be retrieved via a network.

In embodiments at least one of the queried data sources may be internal to the user terminal.

In embodiments the method may comprise: prior to receiving any of the portions in said sequence, performing an initial cache fill operation to retrieve some initial entries from each of one or more of the data sources and initially populate the corresponding cache group therewith; and in response to the receipt of the first portion of the search query in said sequence, initially rendering the application view to include one or more of any of the initial entries in the application view that match the search query so far based on the first portion.

In embodiments, the set of data sources may be a set of multiple data sources, and the queried data sources may be a plurality of the data sources of said set. In this case the entries retrieved from each of the queried data sources are cached in a different corresponding cache group.

In embodiments, the multiple data sources may each have a different latency to retrieve the entries from the data source to the user terminal.

In embodiments, the different sources may have a different probability of finding the target, different access restrictions, and/or different numbers of entries.

In embodiments, the entries retrieved from the different data sources may be cached in a same cache layer having substantially the same latency between the cache layer and the rendering in the application view.

In embodiments, for each cache group, with each time the application view is initially rendered or updated, it may be that only up to a maximum number of the retrieved entries that match the search query so far are included in the application view. The maximum number may be different between at least some of the cache groups.

In embodiments the method may comprise: with each caching operation, removing one or more duplicate entries that were retrieved from two or more of the data sources.

In embodiments, the one or more data sources from which the initial entries are retrieved may comprise only an initial subset of the queried data sources that are subsequently queried once the first portion of the search query is retrieved, the initial subset excluding one or more of the queried data sources that are largest in terms of number entries.

In embodiments, the updating may further comprises removing one, more or all of any entries in the application view that no longer match the search query.

In embodiments, each of said portions of the search query may be an individual character (e.g. letter).

In embodiments, each of the multiple entries may be a record of a party, each party being a person or group of people; and the target entry may be the entry of a target party.

In embodiments the search query may comprise a name of the target party.

In embodiments the queried data sources may comprise one or more of: a list of device contacts maintained on the user terminal; a list of top N contacts of the user in a mailbox of the user maintained externally to the user terminal; a list or graph of social networking contacts of the user from a social networking service external to the user terminal; and/or a global address list being a global list of contacts within an organization of which the user is a member, maintained externally to the user terminal.

In embodiments, the entries from at least one of the sources may be retrieved on a top-N basis, e.g. top N contacts of the user. For instance in the initial cache fill, the top N entries (e.g. contacts) of the user may be cached. And/or, in subsequent caching operations, the entries matching the search query so far may be retrieved from amongst the top N in the source, or could by the top M matching queries. The top N may be determined e.g. based on past behaviour of the user, e.g. which contacts he/she has accessed most frequently in the past, or more generally which entries he/she has interacted with most frequently in the past. N may be any predetermined integer.

According to another aspect disclosed herein there is provided a computer program embodied on computer-readable storage and configured so as when run on one or more processing units of the user terminal to perform the method of any embodiment disclosed herein.

According to another aspect there is provided a user terminal comprising storage comprising one or more storage units and processing apparatus comprising one or more processing units, the storage storing code arranged to run on the processing apparatus and configured so as when run on the processing apparatus to perform the method of any embodiment disclosed herein.

Other variants or use cases of the disclosed techniques may become apparent to the person skilled in the art once given the disclosure herein. The scope of the disclosure is not limited by the described embodiments but only by the accompanying claims.

The invention claimed is:

1. A method performed by a computing device having a processor, the method comprising:
   receiving portions of a search query for a target entry, the portions being received sequentially;
   triggered by the receipt of each respective portion, performing a caching operation comprising:
      querying a first data source and a second data source to retrieve entries matching the received portion of the search query;
      caching first retrieved entries from the first data source in a first cache group;
      caching second retrieved entries from the second data source in a second cache group;
      populating an application view with one or more entries in at least one of the first retrieved entries or the second retrieved entries, the populating comprising removing the one or more entries from at least one of the first cache group or the second cache group;
      querying the first data source and the second data source to retrieve additional entries matching the received portion of the search query; and
      caching one or more of the additional entries in at least one of the first cache group or the second cache group to replace the one or more entries removed from at least one of the first cache group or the second cache group;
   rendering the application view displaying a visual representation of the one or more entries; and
   with each subsequent caching operation:
      selecting an additional entry in at least one of the first cache group or the second cache group following the retrieval based on the received portion of the search query; and
      updating the application view to include the additional retrieved entry.

2. The method of claim 1, wherein one of:
   the application view displays the first retrieved entries in an order in which they were received; or
   the application view displays the first retrieved entries ordered by cache group.

3. The method of claim 1, wherein at least one of the first data source or the second data source is an external data source.

4. The method of claim 1, further comprising:
   prior to receiving the portions of the search query, performing an initial cache fill operation to retrieve initial entries.

5. The method of claim 1, wherein updating the application view further comprises removing one entry that no longer matches the search query.

6. The method of claim 1, wherein each portion of the search query is an individual character.

7. The method of claim 1, wherein each entry is a record of a party.

8. The method of claim 7, wherein the search query comprises a name of the party.

9. The method of claim 7, wherein at least one of the first data source or the second data source comprises one or more of:
   a list of device contacts maintained on a user terminal;
   a list of top N contacts of a user in a mailbox;
   a list of social networking contacts of the user; or
   a global address list.

10. A system, comprising:
   a processor; and
   a memory coupled to the processor and storing instructions that, when executed by the processor, perform operations, comprising:
      receiving, by a client device, portions of a search query for a target entry, the portions being received sequentially;
      triggered by the receipt of each respective portion, performing a caching operation comprising:
         querying a plurality of data sources to retrieve entries matching the received portion of the search query, the plurality of data sources including at least a first data source and a second data source;
         caching, by the client device, first retrieved entries from the first data source in a first cache group; and
         caching, by the client device, second retrieved entries from the second data source in a second cache group;
         populating an application view with one or more entries in at least one of the first retrieved entries or the second retrieved entries, the populating comprising removing the one or more entries from at least one of the first cache group or the second cache group;
         querying the first data source and the second data source to retrieve additional entries matching the received portion of the search query; and
         caching one or more of the additional entries in at least one of the first cache group or the second cache group to replace the one or more entries removed from at least one of the first cache group or the second cache group;
      rendering an application view displaying a visual representation of one or more entries in at least one of the first retrieved entries or the second retrieved entries; and
      with each subsequent caching operation:
         selecting, from the client device, a newly retrieved entry in at least one of the first cache group or the second cache group following the retrieval based on the received portion of the search query; and
         updating the application view to include the newly retrieved entry.

11. The system of claim 10, wherein at least one of the plurality of the data sources is associated with an email application.

12. The system of claim 10, wherein at least one of the plurality of the data sources is associated with a social networking application.

13. The system of claim 10, further comprising instructions for ranking each entry.

14. The system of claim 13, wherein the ranking is based, at least in part, on an interaction threshold.

15. A method performed by a computing device having a processor, the method comprising:
- receiving a first character of a search query, the search query searching for a target entry in a data source;
- based on receiving the first character, performing a first caching operation comprising:
  - querying a first data source and a second data source to retrieve entries matching the first character of the search query;
  - caching first retrieved entries from the first data source in a first cache group;
  - caching second retrieved entries from the second data source in a second cache group;
- populating an application view with one or more entries in at least one of the first retrieved entries or the second retrieved entries, the populating comprising removing the one or more entries from at least one of the first cache group or the second cache group;
- querying the first data source and the second data source to retrieve additional entries matching the first character of the search query; and
- caching one or more of the additional entries in at least one of the first cache group or the second cache group to replace the one or more entries removed from at least one of the first cache group or the second cache group;
- receiving a second character of the search query;
- based on receiving the second character, performing a second caching operation comprising:
  - querying the first data source and the second data source to retrieve entries matching the first character and the second character of the search query;
  - caching third retrieved entries from the first data source in the first cache group; and
  - caching fourth retrieved entries from the second data source in the second cache group; and
- rendering the application view displaying a visual representation of at least one of the third retrieved entries or the fourth retrieved entries.

16. The method of claim 15, further comprising ranking at least one of the first retrieved entries or the second retrieved entries based, at least in part, on an interaction metric.

17. The method of claim 15, further comprising precaching one or more entries prior to receiving the first character of the search query.

18. The method of claim 17, wherein the precaching of the one or more entries is based, at least in part, on an interaction metric.

19. The method of claim 15, wherein at least one of the first retrieved entries or the second retrieved entries are displayed in an order in which they were identified.

20. The method of claim 15, wherein the target entry is an identifier of an entity.

* * * * *